(12) United States Patent
Rose

(10) Patent No.: US 9,195,978 B1
(45) Date of Patent: *Nov. 24, 2015

(54) DYNAMIC QUERY SEQUENCES FOR RETRIEVAL OF NEGOTIABLE INSTRUMENT IMAGE

(71) Applicant: Intuit Inc., Mountain View, CA (US)

(72) Inventor: Douglas E. Rose, Simi Valley, CA (US)

(73) Assignee: INTUIT INC., Mountain View, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/923,204

(22) Filed: Jun. 20, 2013

Related U.S. Application Data

(63) Continuation of application No. 12/915,313, filed on Oct. 29, 2010, now Pat. No. 8,478,744.

(51) Int. Cl.
  *G06F 17/30* (2006.01)
  *G06Q 20/10* (2012.01)
  *G06Q 40/02* (2012.01)

(52) U.S. Cl.
  CPC ........ *G06Q 20/108* (2013.01); *G06F 17/30864* (2013.01); *G06Q 40/02* (2013.01)

(58) Field of Classification Search
  CPC .......................... G06F 17/30864; G06Q 40/02
  USPC ................. 705/30, 35, 37; 707/721, 999.004, 707/999.006, 722
  See application file for complete search history.

(56) References Cited

U.S. PATENT DOCUMENTS 6,301,379 B1 * 10/2001 Thompson et al. ............. 705/45
7,475,807 B2 * 1/2009 Halpin et al. .................. 235/378
7,661,587 B1 * 2/2010 Mok et al. ...................... 705/45
8,060,441 B2 * 11/2011 Stewart et al. .................. 705/40
2005/0203885 A1 * 9/2005 Chenevich et al. ............... 707/3

OTHER PUBLICATIONS

Office Action dated Apr. 30, 2012 in U.S. Appl. No. 12/915,313, filed Oct. 29, 2010, (10 pages).
Amendment dated Jul. 25, 2012 in U.S. Appl. No. 12/915,313, filed Oct. 29, 2010, (17 pages).
Final Office Action dated Oct. 22, 2012 in U.S. Appl. No. 12/915,313, filed Oct. 29, 2010, (13 pages).
Notice of Allowance dated Mar. 5, 2013 in U.S. Appl. No. 12/915,313, filed Oct. 29, 2010, (7 pages).

* cited by examiner

*Primary Examiner* — Marc Filipczyk
(74) *Attorney, Agent, or Firm* — Vista IP Law Group LLP; Gary D. Lueck

(57) ABSTRACT

Determining sequences of queries for retrieving images of negotiable instruments such as checks. A request for a check image is received from a first computer such as an account holder computer at a second, intermediate computer that hosts an on-line banking program and is in communication with a third computer of a financial institution. A sequence program is executed to determine a first sequence of queries having respective query formats available to attempt to retrieve the requested image from an image server or data store. The first sequence is determined based on historical data of whether respective query formats were successfully used in the past to retrieve respective requested images from the data store and is dynamically updated to reflect whether queries were used to retrieve requested images. Thus, with embodiments, the order of queries to utilize is dynamic and can change as opposed to being pre-determined or static.

38 Claims, 12 Drawing Sheets

FIG. 1
(PRIOR ART)

First Sequence (1, 2, 3) / First Historical Data

| Query | Retrieval Successes With Query | Retrieval Failures With Query | Ratio |
|---|---|---|---|
| 1 | 3 | 1 | 3/1 |
| 2 | 0 | 2 | 0/2 |
| 3 | 0 | 2 | 0/2 |

FIG. 9A

First Sequence (1, 2, 3) / Second Historical Data (Query 1 Fails)

| Query | Retrieval Successes With Query | Retrieval Failures With Query | Ratio |
|---|---|---|---|
| 1 | 3 | 2 | 3/2 |
| 2 | 0 | 2 | 0/2 |
| 3 | 0 | 2 | 0/2 |

FIG. 9B

First Sequence (1, 2, 3) / Third Historical Data (Query 2 Fails)

| Query | Retrieval Successes With Query | Retrieval Failures With Query | Ratio |
|---|---|---|---|
| 1 | 3 | 2 | 3/2 |
| 2 | 0 | 3 | 0/3 |
| 3 | 0 | 2 | 0/2 |

FIG. 9C

First Sequence (1, 2, 3) / Fourth Historical Data (Query 3 Successful)

| Query | Retrieval Successes With Query | Retrieval Failures With Query | Ratio |
|---|---|---|---|
| 1 | 3 | 2 | 3/2 |
| 2 | 0 | 3 | 0/3 |
| 3 | 1 | 2 | 1/2 |

FIG. 9D

426a-c → 427b  Second Sequence (1, 3, 2) / Fifth Historical Data  429d

| Query | Retrieval Successes With Query | Retrieval Failures With Query | Ratio |
|---|---|---|---|
| 1 | 3 | 2 | 3/2 |
| 3 | 1 | 2 | 1/2 |
| 2 | 0 | 3 | 0/3 |

FIG. 9E

426a-c  427b  Second Sequence (1, 3, 2) / Sixth Historical Data (Query 1 Fails)  429e

| Query | Retrieval Successes With Query | Retrieval Failures With Query | Ratio |
|---|---|---|---|
| 1 | 3 | 3 | 1/1 |
| 3 | 1 | 2 | 1/2 |
| 2 | 0 | 3 | 0/3 |

FIG. 9F

426a-c  427b  Second Sequence (1, 3, 2) / Seventh Historical Data (Query 2 Successful)  429f

| Query | Retrieval Successes With Query | Retrieval Failures With Query | Ratio |
|---|---|---|---|
| 1 | 3 | 3 | 1/1 |
| 3 | 2 | 2 | 1/1 |
| 2 | 0 | 3 | 0/3 |

FIG. 9G

426a-c 427c 429f
↓ Third Sequence (1, 3, 2) (Most Recent as Tie Break) / Fifth Historical Data

| Query | Retrieval Successes With Query | Retrieval Failures With Query | Ratio |
|---|---|---|---|
| 3 | 2 | 2 | 1/1 |
| 1 | 3 | 3 | 1/1 |
| 2 | 0 | 3 | 0/3 |

FIG. 9H

426a-c 427c 429f
↓ Third Sequence (1, 3, 2) (Delete Query) / Fifth Historical Data

| Query | Retrieval Successes With Query | Retrieval Failures With Query | Ratio |
|---|---|---|---|
| 3 | 3 | 3 | 1/1 |
| 1 | 2 | 2 | 1/1 |

FIG. 9I

DYNAMIC QUERY SEQUENCES FOR RETRIEVAL OF NEGOTIABLE INSTRUMENT IMAGE

CROSS-REFERENCE TO RELATED APPLICATION

This application is a continuation of co-pending U.S. application Ser. No. 12/915,312 filed Oct. 29, 2010 and entitled DYNAMIC QUERY SEQUENCES FOR RETRIEVAL OF NEGOTIABLE INSTRUMENT IMAGE, issued as U.S. Pat. No. 8,478,744 on Jul. 2, 2013, priority of which is claimed under 35 U.S.C. §120, and the contents of which are incorporated herein by reference as though set forth in full.

BACKGROUND

On-line or Internet banking has become increasingly popular and has greatly simplified how users, customers or account holders conduct transactions and manage finances. On-line banking (OLB) allows bank customers to manage and track financial applications such as deposits, withdraws, loan amounts, credit card amounts, and other financial matters at the user's convenience, at various locations and at various times.

In known on-line systems, OLB services are provided by a host of an intermediate computer that serves as an interface between the user computer and a computer of a financial institution (FI) at which the user has an account. A browser executes on a user computer to access the intermediate computer, and an OLB program executes on the intermediate computer to access the FI computer and provide the user with on-line accesses to the account.

Referring to FIG. 1, during an OLB session, the user may request to view a copy of a check 100 that posted to the account, e.g., by clicking on a link or other check 100 identifier during an OLB session. Upon receiving the request, a check imaging program of or associated with the OLB program formulates and sends a query to an image server to retrieve the image. The image server may store images of checks 100 for that particular FI or multiple FIs. The retrieved image is then displayed to the user.

The configuration of the query submitted from the intermediate computer to the image server to retrieve the requested image is typically specified by the FI and/or host of the image server or formulated in view of FI and/or image server host requirements. For example, referring to FIG. 1, it may be required that the query include certain information such as data in the Magnetic Ink Character Recognition (MICR) line 110 of a check 100. The MICR line is used by FIs to allow computers to read check 100 data and may include the Routing and Transit Number (RTN) 112, account number 114 or other identifier, which may have a particular format based on the account number, check number 116 and other information identifying the check 100. The query configuration may also involve data such as user or account holder identification information such as name 122 and address 124, check amount 132 and date 134.

As a further example, the query may be required to include certain information about the image server from which the image is to be retrieved. The FI may use a particular image vendor for scanning checks 100 and storing the images at an image server such that the query must be configured to identify the particular location (e.g., URL address) of the image server and a protocol for communicating with the image server. The image server provides a particular application program interface (API) that is utilized to retrieve the image files from the image server.

Thus, there may be a number of constraints on how queries for images of checks 100 are configured. The constraints may be even more restrictive and complicated when there are changes involving the user, FI and/or image server host such that query configurations that are utilized do not have the correct configuration data and thus fail to retrieve the requested image.

For example, the user's FI may have been acquired by another FI or merged with the other FI, which has its own check 100 format and different MICR line 110 data. Further, the user may have and use checks 100 with two different formats, e.g., two different MICR lines 110 with different routing numbers 112 and account numbers 114 due to the change involving the FI. The user may utilize some or all of the remaining original checks 100 for a certain time or until they run out and then transition to the new checks 100 with the updated information. The other FI may also use a different or multiple image vendors who scan and store physical checks 100 and different image servers that are at different locations or Uniform Resource Locator (URL) addresses and have their own communication protocols and APIs. Further, certain information on old checks may be outdated, e.g., if the user moved and changed addresses or had a name change due to marriage or divorce.

The host of the intermediate computer may not be notified of these changes such that the query configuration provided by the FI to the host and utilized to submit a request for a check image results in failure to retrieve the image even if the image is stored at the image server. In these cases, the user is not able to view the check image. Other times, the host may be informed of the changes by the FI, and if multiple query configurations are utilized (e.g., pre- and post-merger or based on old and new check or MICR data), the FI specifies a sequence of query configurations to be utilized for image retrieval. The FI may specify that the post-merger checks or query format be utilized as the primary query configuration, and queries structured according to the specified sequence are submitted until the image is retrieved or there are no other query configurations to utilized and the user is informed that the image cannot be retrieved.

Current systems and methods for retrieving check images, therefore, involve multiple and unnecessary requests and communications between computers, which involves additional bandwidth and query response and image retrieval delays, and potential failure to retrieve the image when the image is available due to use of the wrong query configuration. These shortcomings result in user inconvenience and frustration and negatively impact the user's OLB experience. Further, users may call the host of the OLB program regarding the inability to view check images, thus requiring additional time and costs to address image retrieval failures.

SUMMARY

Embodiments relate to dynamic query sequences for requesting images of financial documents such as negotiable instruments including checks from a data store or image server. The query sequences are dynamic and change over time in contrast to static or fixed query sequences that are currently utilized and specified by a FI and/or host of the image server. With dynamic sequence modification, queries that are successful more often and/or most recently are utilized before other queries that are less successful and/or not utilized most recently. In this manner, embodiments structure query sequences for more likely and faster image retrieval even with changes such as MICR line changes, a user transitioning from old checks to new checks, one FI purchasing or merging with another FI or a change of the host of a server or data store including the images. Thus, embodiments reduce the number of queries submitted to an image data store or server, making check image retrieval more efficient and reducing burdens on OLB programs, networks and image servers.

One embodiment is directed to a method for determining a sequence of queries for retrieving an image of negotiable instrument such as a check. The method comprises receiving a request for the image of the check from a first computer of a user or account holder through a first network at a second, intermediate computer, which hosts an OLB program and is in communication with a third computer of a FI through a second network. Thus, in the context of OLB, the intermediate computer is not a computer of the FI and instead is hosted by a third party that manages OLB programs and OLB or production servers. The method further comprises determining, with a sequence program associated with the OLB program, a dynamically modifiable sequence of queries comprising respective query configurations or formats available to attempt to retrieve the image from a data store including a plurality of negotiable instrument images. The sequence is determined by the sequence program based at least in part upon first historical data of whether respective query formats were used in the past to retrieve respective requested images from the data store.

A further embodiment is directed to a computer-implemented method for determining a sequence of queries for retrieving an image of negotiable instrument such as a check and comprises receiving a first request for a first image of a first check from a first computer through a first network at a second, intermediate computer that hosts an OLB program and is in communication with a third computer of a FI through a second network. The method further comprises determining, with a sequence program associated with the OLB program, a first sequence of queries comprising respective query configurations or formats available to attempt to retrieve the first image from a data store that includes check images. The first sequence is determined based at least in part upon first historical data of whether respective query formats were successfully used in the past to retrieve respective requested images from the data store. The method further comprises submitting a first query of the first sequence from the second, intermediate computer to the data store, receiving a first result generated by executing the first query of the first sequence and determining, with the sequence program, a second sequence of queries comprising respective query formats based at least in part upon the second historical data reflecting the first result.

Further embodiments are directed to computer programs or computer program products, which may be a part of an OLB program or a separate program that executes on the second, intermediate or other computer or that is stored on a tangible medium. The computer program or product comprises instructions that are executable by a computer to execute method embodiments.

Yet other embodiments are directed to systems for dynamically determining query sequences for requesting images of negotiable instruments such as checks from a data store or image server. System embodiments may involve a first computer that is in communication with a second, intermediate computer through a first network, and a third or FI computer that is in communication with the second computer through a second network. The second, intermediate computer hosts an OLB program and is configured receive a request for a check (e.g., during an OLB session) that is to be retrieved from an image data store or server.

A system constructed according to one embodiment comprises a sequence program and a database. The sequence program is associated with or a component of the OLB program and the database includes historical data of whether query formats were used in the past to successfully retrieve an image from the data store. One or both of the sequence program and the database may reside on or be hosted by the second, intermediate computer and one or both of these system components may reside on or be hosted by another computer that is associated with or in communication with the second computer. The sequence program is configured or operable to determine a dynamically modifiable sequence of queries comprising respective query configurations or formats available to attempt to retrieve an image of a check from the data store. The sequence is determined by the sequence program based at least in part upon first historical data within the database.

In another system embodiment, the sequence program is configured to determine a first sequence of queries comprising respective query formats available to attempt to retrieve the first image from a data store that includes check images. The first sequence is determined based at least in part upon first historical data of whether respective query formats were successfully used in the past to retrieve respective requested images from the data store. The sequence program is further configured to submit a first query of the first sequence, e.g., from the second, intermediate computer to the data store, and receive a first result generated by executing the first query of the first sequence, update the first historical data to form second historical data, and determine a second sequence of queries (during the same or subsequent OLB session) comprising respective query configurations or formats based at least in part upon the second historical data reflecting the first and/or other results.

In a single or multiple embodiments, the first sequence of queries is dynamically changed to a second, different sequence that is different than the first sequence by re-ordering queries and/or deleting at least one query. The second historical data that is used to generate the second sequence reflects whether the first query (or other queries or a predetermined number of queries) successfully retrieved the first image.

For example, the first query of the first sequence may have been submitted but was not successful in retrieving the first image. A second query of the same first sequence is submitted, and a second result is generated. A database of historical data, e.g., which may be stored as a table or other data structure, is updated with the second result such that the resulting second historical data indicates whether that the first query of the first sequence was not successful in retrieving the requested image and also indicates whether the second query of the first sequence successfully retrieved the requested image. A second sequence of queries may be generated based on prior query failures and successes (or other data such as a ratio of failures and successes), and then queries from the second sequence may be utilized for subsequent requests or subsequent queries for the same request.

In a single or multiple embodiments, in cases in which the historical data comprises two query configurations or formats that have the same criteria, e.g., same number of image retrieval failures, same number of image retrieval successes or same ratio of successes and failures, the query configuration or format utilized most recently is selected as being before or having priority over the other configuration or format.

In a single or multiple embodiments, the query configurations or formats include data such as an address or location of the data store, a protocol for communicating with the data store and at least one data element used to identify the requested image. The requested image may be identified by one or multiple data elements including, but not limited to, an account number, a number of the negotiable instrument, a date of the negotiable instrument, a routing number, an identification of the account holder, and an identification of the negotiable instrument image, or various combinations thereof.

With embodiments, sequences of query configurations can be dynamically updated to reduce the number of queries and make image retrieval more efficient when query configuration changes result from, for example, changes of MICR lines of negotiable instruments, customers using negotiable instruments having different formats (e.g., old and new checks), negotiable instruments having different formats due to an acquisition or merger involving the financial institution, a change of a core server associated with the FI, change in printing of negotiable instruments, and changes in how negotiable instrument images are stored.

BRIEF DESCRIPTION OF THE DRAWINGS

The foregoing and other aspects of embodiments are described in further detail with reference to the accompanying drawings, wherein:

Figure 1:
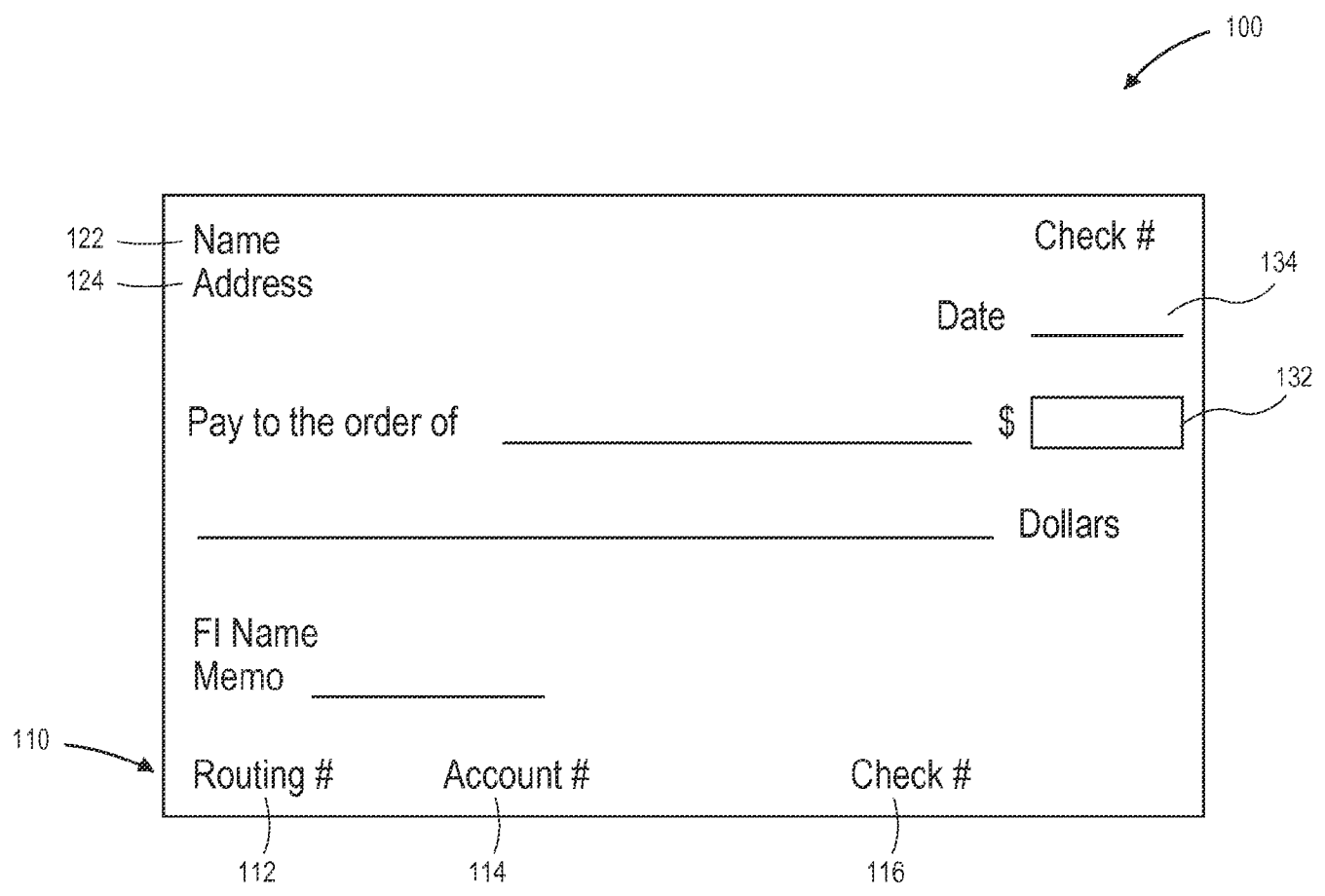

FIG. 1 generally illustrates negotiable instrument in the form of known check and types of data printed on the check;

FIGS. 9A-I illustrate examples of how embodiments may be implemented, how historical data is updated, and how query sequences can be dynamically modified based at least in part upon historical data changes.

DETAILED DESCRIPTION OF ILLUSTRATED EMBODIMENTS

Embodiments are directed to systems, methods and computer program products for dynamically adjusting a sequence of a query having respective query configurations for requesting images of financial document from an image server or data store. According to embodiments, the financial document may be a negotiable instrument such as a check. With embodiments, sequences of queries to the image server are dynamic and change over time to adapt to changes in query successes and failures in contrast to known static or fixed query sequences that are currently utilized and specified by FIs. In this manner, queries and query sequences that are utilized initially may change over time in response to changes related to the user, negotiable instrument and FI, e.g., the user's FI was involved in a merger or acquisition, a change of MICR line data, the user transitioning from old checks to new checks with new data. Thus, embodiments improve OLB experiences and image retrieval efficiency by successfully retrieving images more often, retrieving images more quickly, reducing the number of queries submitted to an image data store or server, and reducing burdens on OLB programs, networks and image servers.

Figure 2:
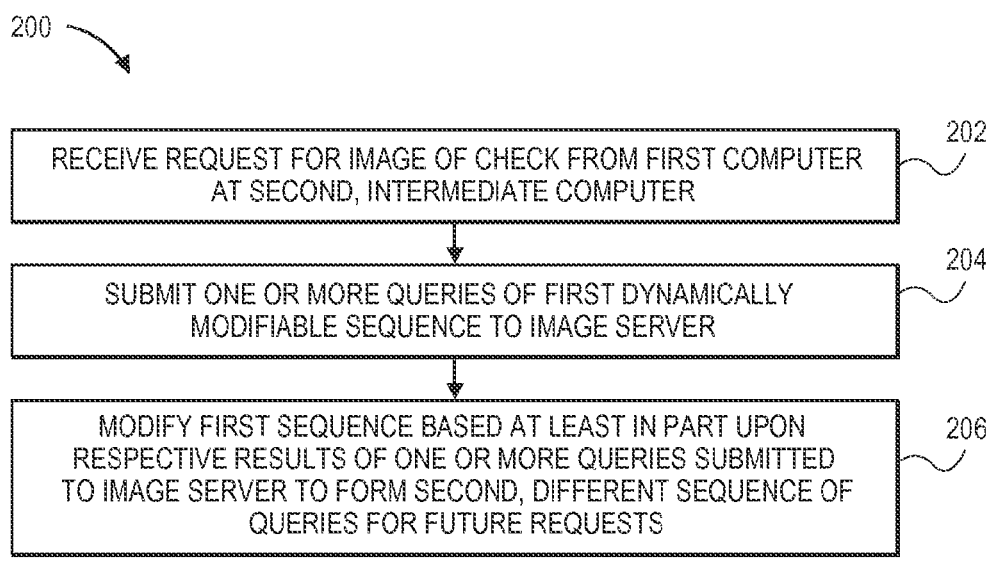
FIG. 2 is a flow diagram of one embodiment of a method for dynamically modifying a sequence of a query used to retrieve an image of a check based at least in part upon historical retrieval data.

For example, in one embodiment shown in FIG. 2, a method 200 for determining a sequence of queries to utilize for retrieving images of a negotiable instrument such as a check, involves, at 202, receiving a request for an image of a check from first computer at a second, intermediate computer, and at 204, submitting one or more queries of the first dynamically modifiable sequence to an image or data store that stores check images in an attempt to retrieve the requested image. At 206, the first sequence is modified based at least in part upon respective results of the one or more prior queries submitted to the image server. Thus, the first query sequence is dynamically modified to form a second, different sequence for future image requests, which may be during the same or subsequent OLB session.

Figure 3:
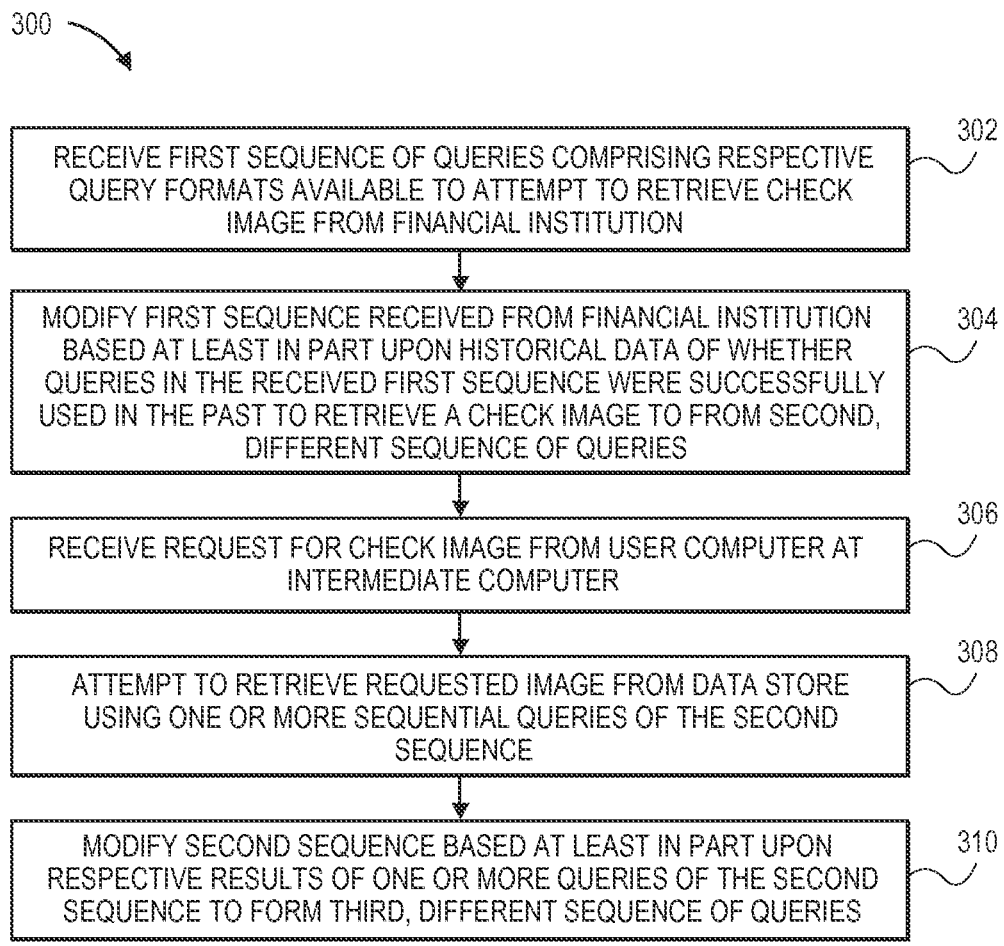
FIG. 3 is a flow diagram of another embodiment of a method for dynamically modifying a sequence of a query used to retrieve an image of a check based at least in part upon historical retrieval data.

In another embodiment, referring to FIG. 3, a method 300 for determining a sequence of queries to utilize for retrieving check images involves, at 302, receiving a first sequence of queries comprising respective query formats available to attempt to retrieve the image from the FI at intermediate computer. The first sequence is fixed or static and specified by the FI and/or the host of the image server. At 304, the first sequence is modified based at least in part upon historical data of whether queries in the received first sequence were successfully used in the past to retrieve an image to form second sequence of queries. At 306, a request for an image of a check is received from a user or account holder computer at the intermediate computer, and at 308, one or more attempts are made to retrieve the requested image from the image server using one or more sequential queries of the second sequence. At 310, the second sequence is modified based at least in part upon respective results of one or more queries of the second sequence to form third sequence of queries. Various embodiments and aspects thereof are described in further detail with reference to FIGS. 4-10.

Figure 4:
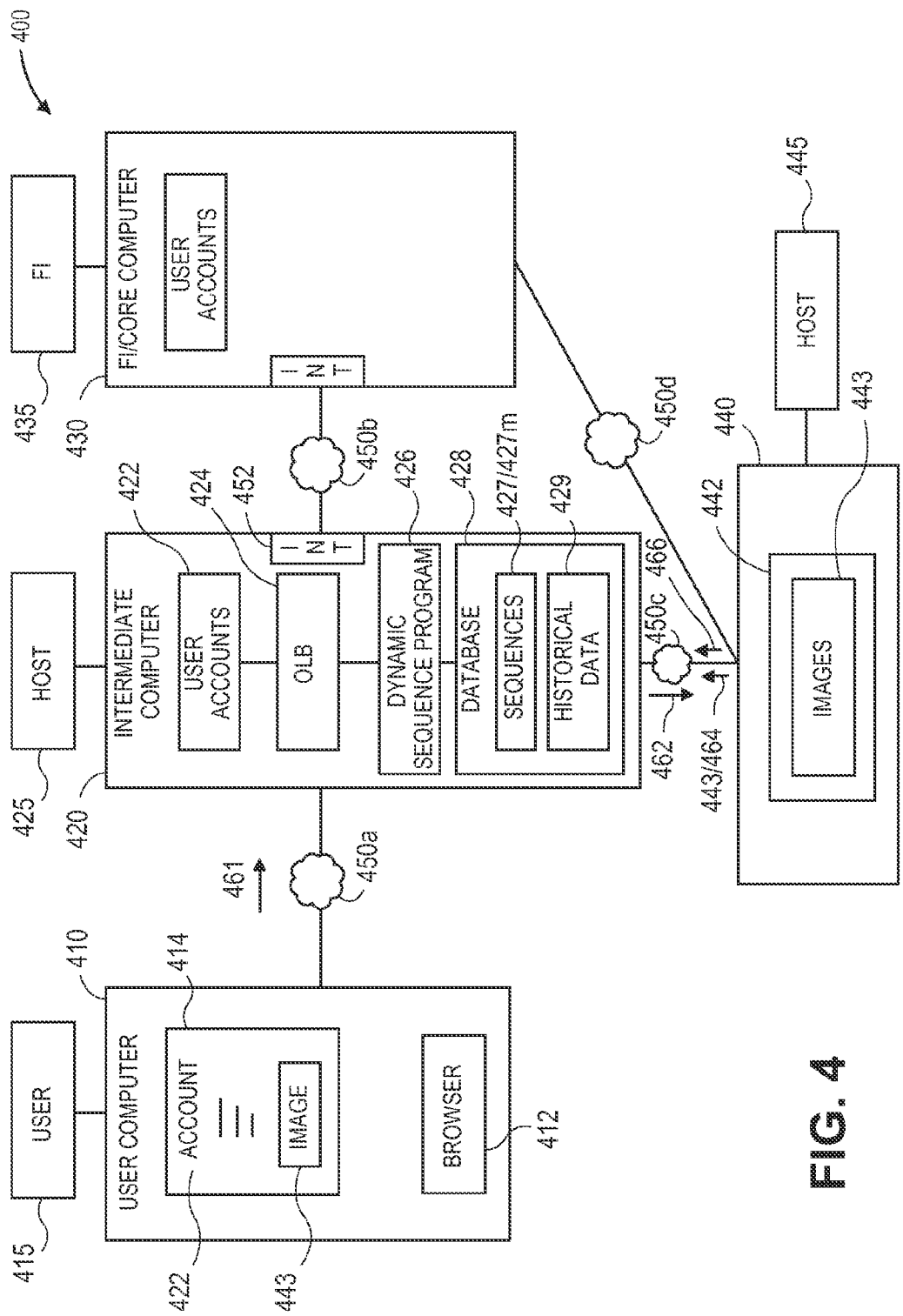
FIG. 4 illustrates a system constructed according to one embodiment for dynamically modifying query sequences for check image retrieval.

Referring to FIG. 4, a system 400 constructed according to one embodiment for performing method embodiments for determining query sequence for retrieval of an image of a check comprises or involves a first computer 410 of a user, customer or account holder 415 (generally, "user" 415), a second, intermediate, host or production computer 420 (generally, "intermediate computer" 420) managed by a host 425, a third computer 430 of a FI 435 and a fourth computer, server or data store 440 (generally, "image server" 440) managed by image host or vendor 445 that receives and stores images 443 of checks 100 or scans checks 100 that have been processed by a FI 435 and stores the images 443 in a data store, database, table or other data structure 442 (generally, "data store" 442).

The user 415 may be an individual, company or other organization that has an on-line banking account 422 hosted by or accessible through the intermediate computer 420. For this purpose, a host 425, such as Intuit Financial Services of Intuit Inc., Mountain View, Calif., Fiserv, Inc, Jack Henry & Associates, Online Resources Corporation, S1 Corporation and other hosts, manage the intermediate computer 420, and an OLB program 424 executes on the intermediate computer 420 to provide the user 415 with on-line access to the account 422.

The FI 435 at which the user 415 has the account 422 may be, for example, a savings/checking account (examples of which include savings or share, checking or share draft and money market accounts), investment accounts (examples of which include Keogh, 401k and certificate of deposit) and loan accounts (examples of which include credit line loan, credit card loan, installment loan, consumer loan, commercial loan, mortgage loan, residential mortgage loan, commercial real estate loan, home equity loan, general ledger account, general ledger code, commercial loan—master, commercial loan—credit line and commercial loan—note), and the images 442 stored may be images 422 of financial documents associated with such accounts such as account statements, confirmations, transaction receipts, etc. For ease of explanation, reference is made to a user 415 who has a checking account 422 with a FI 435 and that is accessible through the intermediate computer 420, and retrieval of images 442 of checks 100 stored at the image server 440.

In other system configurations, the FI computer 430 may include or be operably coupled to or in communication with a core computer or server (not separately illustrated in FIG. 4) that includes a database of the account and transaction data for respective accounts of respective customers of the FI 435, some of whom may be accessing their respective accounts on-line through the intermediate computer 420. A core server is part of a back-end system that is used for processing daily banking transactions including credits and debits, posting updates to accounts and other financial records. Reference to a FI computer 430 is defined to include the FI computer 430 and/or the core server, but it should be understood that these may be part of the same system or the core server may be separate and operably coupled to or in communication with the FI computer 430. For ease of explanation, reference is made to FI computer 430 and a user account 422 at the FI 435.

For communications between system 400 components, the user computer 410 is operably coupled to or in communication with the intermediate computer 420 through one or more networks 450a, the intermediate computer 420 is operably coupled to or in communication with the FI computer 430 and the image server 440 through one or more respective networks 450b and 450c, and the FI computer 430 may also be operably coupled to or in communication with the image server 440 through one or more networks 450d (as illustrated in FIG. 4).

The networks 450a-d (generally, "network" 450), and other networks 450 discussed herein, may be a Local Area Network (LAN), a Wide Area Network (WAN), Metropolitan Area Network (MAN), a wireless network, other suitable networks capable of transmitting data, or a network may be a combination of such networks or utilize different communication methods or protocols. For ease of explanation, reference is made to a network 450 generally, but it should be understood that various numbers and types of networks 450 may be utilized for communication between system 400 components.

A browser 412 such as INTERNET EXPLORER, MOZILLA FIREFOX or another browser executes on the user computer 410 such that the user 415 can connect to the Internet via a network 450 and log into the account 422 using the OLB program 424. INTERNET EXPLORER is a registered trademark of Microsoft Corporation, Redmond, Wash., and MOZILLA and FIREFOX are registered trademarks of Mozilla Foundation, Mountain View, Calif. The OLB executes on the intermediate computer 420 and provides a web page or other user interface that is displayed 414 to the user to allow the user 415 to access, view, utilize and manage the account 422. Through an appropriate communications interface or protocol 452 (generally, "interface" or "INT" in FIG. 4), the intermediate computer 420 and the FI computer 430 communicate with each other typically using secure communications involving an extranet site or website such as an internal website that provides for secure communications between the intermediate and FI computers 420, 430.

Figure 5:
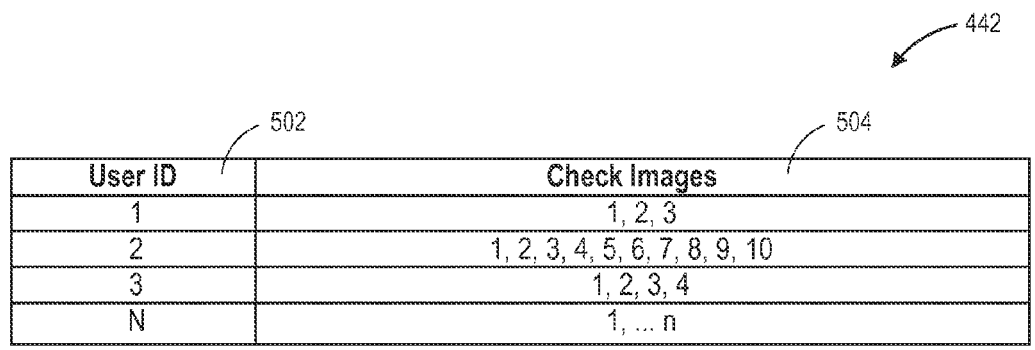
FIG. 5 generally illustrates one manner in which images may be stored and searched within an image server or data store according to embodiments.

Referring to FIG. 5, check images 443 may be stored in the data store 442 of the image server 440 as a table 500 or other data structure that associates a user 415 or account 422 with stored check images 443. A first column 502 includes user or account identification (ID) and a second column 504 identifies check images 443 associated with that user or account ID. In the illustrated example, the image server 440 stores images 443 of Checks 1-3 that were written by User 1, images 443 of Checks 1-10 written by User 2, images 443 of Checks 1-4 written by User 3, and so on. The image server 440 may store images 443 of checks 100 for users 415 or account holders of a particular FI 435 or multiple FIs 435. Thus, it will be understood that FIG. 5 is provided to generally illustrate that the image server 440 stores check images 443, and the data store 442 may include images 443 of checks 100 of various numbers of users 415, that various numbers of check images 443 may be stored for each user 415, and that the images 443 may be stored and searchable according to various types of user 415 or account 422 data and combinations thereof.

Referring again to FIG. 4, according to embodiments, the intermediate computer 420 also hosts a dynamic sequence program 426 and a database 428. In the illustrated embodiment, the dynamic sequence program 426 is a separate program that executes with the on-line banking program 424, but in other embodiments, the dynamic sequence program 426 may be a part or module of the on-line banking program 424. Further, in the illustrated embodiment, the database 428 is hosted by the intermediate computer 420, but in other embodiments, the database 428 may be hosted by another computer that is operably coupled to or in communication with the intermediate computer 420 via a network 450.

According to embodiments, the dynamic sequence program 426 is operable to submit queries 462 having respective query formats to the image server 440 in response to a request 461 for an image 443 of a check 100 by the user 415, and receive results 464 generated by executing those queries 462 from the image server 440 or another program associated with check image 443 retrieval. For this purpose, the dynamic sequence program 426 is operable to access the database 428 to generate, collect, store, update, read and manage historical data 429. According to one embodiment, historical data 429 relates to whether prior queries 462 submitted in response to prior requests 461 were utilized to successfully retrieve the requested image 443 from the image server 440, or of the query 462 failed such that the requested image was not retrieved from the image server 440.

Figure 6:
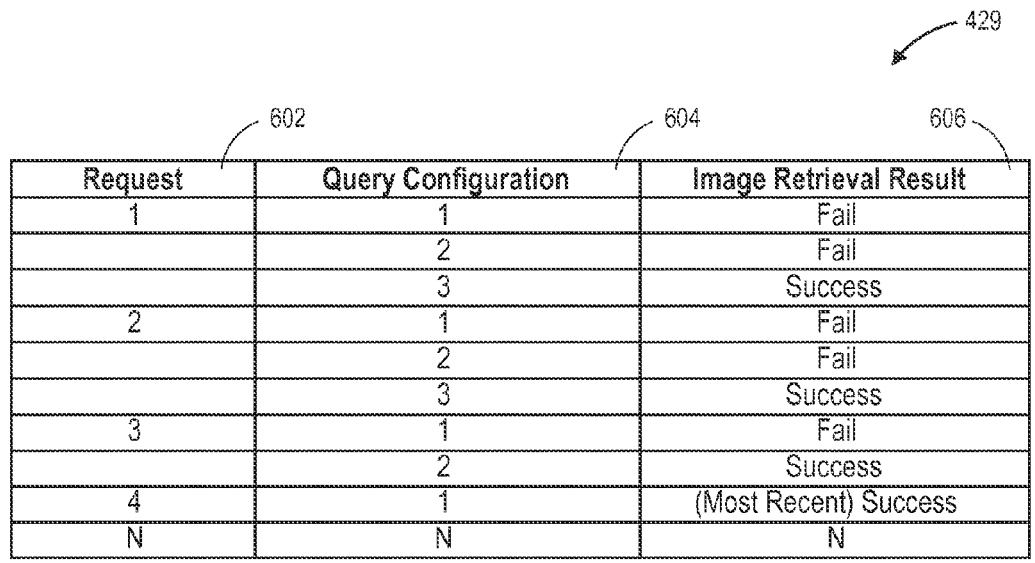
FIG. 6 generally illustrates one manner in which historical data may be structured and updated according to embodiments.

For example, referring to FIG. 6, in the illustrated embodiment, historical data 429 may be stored in a table 600 that includes a first column 602 identifying prior requests 461, a second column 602 identifying the queries 462 or configurations thereof that were utilized to attempt to retrieve the requested image, and a third column with data indicating whether the query 462 was successful or failed. Queries 462 may be configured based upon different types and combinations of data including, for example, user or account holder name, user or account holder address, account number, check number, check date, check amount, RTN, a URL of the image server 440, and a confirmation or check locator that is received at the intermediate computer 420 from the FI computer 430 after a check 100 is processed by the FI 435. For example, one query 462 may be configured to include a first account number, a check number and a URL of the image server 440, whereas another query 462 is configured to include a second account number, a RTN, a check number, a check amount and a URL of the image server, whereas another query configuration may involve all of the configuration data mentioned above.

It will be understood that different queries 462 can have different, respective query configurations, and examples of different query configurations may include, for example, a) Image Server URL, RTN, Customer Number, Account Number, Account Type, Check Amount, Check Number, Check Posting Date, b) Image Server URL, RTN, Account Number, Check Amount, Check Number, Check Posting Date, c) Image Server URL, RTN, Customer Number, MICR Number, Account Type, Check Amount, Check Number, Check Posting Date, d) Image Server URL, RTN, MICR Number, Check Amount, Check Number, Check Posting Date. e) Image Server URL, RTN, Customer Number, Account Number, Account Type, Check Amount, Check Number, Check Posting Date, Check Locator, and f) Image Server URL, Image Type, RTN, Customer Number, Account Number, Check Amount, Check Number, Check Posting Date.

FIG. 6 illustrates an example in which Queries 1-3 were utilized before to attempt to retrieve respective images 443 in response to respective Requests 1 and 2, and that the requested images 443 were eventually retrieved using Query 3 whereas the other Queries 1 and 2 failed for both of Requests 1 and 2. FIG. 6 further illustrates that Queries 1 and 2 were submitted to the image server 440 in response to Request 3, and that Query 2 was successful in retrieving the image 443 whereas Query 1 was not. FIG. 6 also illustrates a further example in which Query 1 was submitted to the image server 440 in response to Request 4 (the most recent request) and was successful in retrieving the requested image 443. Thus, Query 1 was used most recently to receive a requested image 443.

Figure 7A:
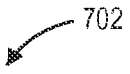
FIGS. 7A-C further illustrate historical data that may be utilized in embodiments in the form of a number of successful image retrievals, a number of image retrieval failures, and a ratio of image retrieval successes and failures.
Figure 7B:
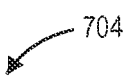
Figure 7C:
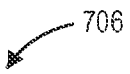

Referring to FIGS. 7A-C, the successes and failures can be further summarized or reflected as historical data 429 in the form of a tables indicating a number successful image 443 retrievals for each query 462 (FIG. 7A, 702), a number of failed image 443 retrievals for each query 462 (FIG. 7B, 704) and/or a ratio of image 443 retrieval successes and failures (FIG. 7C, 706). The number of successes and failures provide actual indications of the effectiveness of individual queries 462 based on results 464 received from the image server 440, whereas the ratio provides a relative comparison of different queries 462.

The historical data 429 may track whether queries 462 were successfully utilized before application of embodiments to determine whether a sequence 427 of queries 462 should be dynamically modified and/or after application of embodiments to determine whether a dynamically modified sequence 427m ("m" referring to modified once or multiple times before) should be modified again. For ease of explanation, reference is made generally to a sequence 427, but it should be understood that the sequence being analyzed may be an original, unmodified sequence or a sequence that was modified before.

Thus, historical data 429 may include data generated by execution of queries 462 in a particular, static sequence 427 specified by the FI 430 and/or host 445 of the image server 440, and embodiments may be used to generate and collect historical data 429 generated by these known, static query sequences 427 in order to determine whether embodiments should be applied to dynamically modify the initial sequence 427 and/or to generate and collect historical data 429 resulting from execution of queries 462 in a sequence 427m modified according to embodiments to determine whether the previously modified sequence 427m should be modified again.

Accordingly, it will be understood that various figures are provided to generally illustrate that the image server 440 stores check images 443, the image server 440 may include images 443 for various numbers of users 415, different numbers of check images 443 may be stored for each user 415, check images 443 may be stored, searchable and retrievable based upon different types of data or criteria. Further, it will be understood that while various figures generally illustrate that certain types of historical data 429 may be generated, stored, analyzed and updated, the database 428 may store other types of data and combinations thereof, for a single user 415 (as shown in FIG. 6), multiple users 415 and/or users 415 having accounts 422 at different FIs 435. Accordingly, FIGS. 4-6, for example, are provided to generally illustrate the image server 440 stores images 443 of processed checks 100, and that with embodiments, the history of image 443 retrieval can be tracked using the dynamic sequence program 426 and database 428.

Further, it should be understood that while FIGS. 4-6 illustrate one system 400 configuration for implementing embodiments, embodiments may also be utilized in or involve other system configurations and other numbers of users 115 and user computers 110, hosts 125 and intermediate computers 120, FIs 135 and FI computers 130, and hosts 145 and image servers 140. For example, the OLB program 424 may be used to provide multiple users 415 access to respective on-line accounts 422 of a particular FI 435 or users 415 may have accounts 422 at different FIs 430, and one or multiple FIs 430 may use the same or different image servers 440 for storing check images 443.

Figure 8:
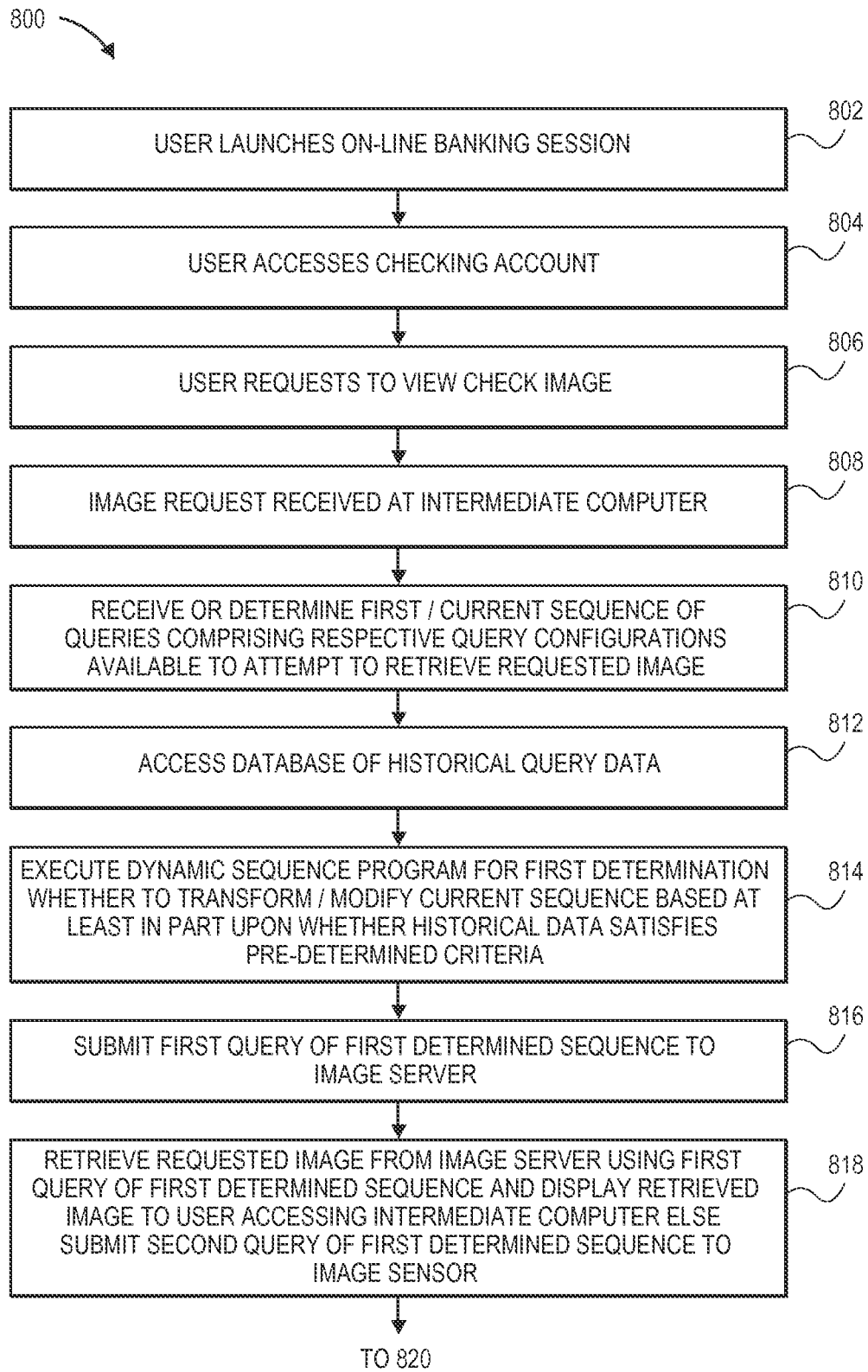
FIG. 8 is a flow diagram of another embodiment of a method for dynamically modifying a sequence of query used to retrieve an image of a check based at least in part upon historical retrieval data.
Figure 8:
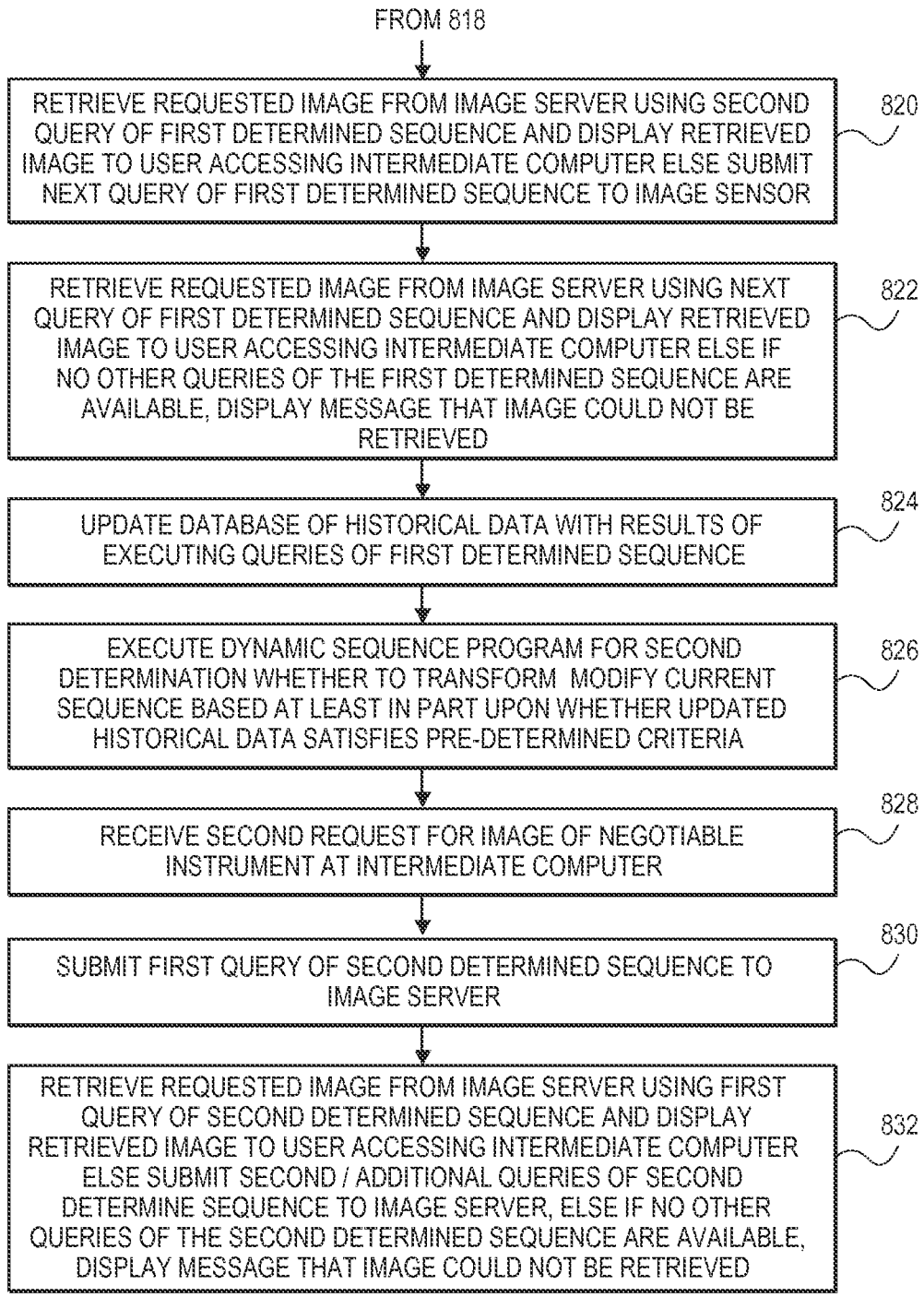

Referring to FIG. 8, a method 800 for retrieving a check image 443 and determining sequence 427 of queries 462 having respective query configurations for attempting to retrieve the image 443 using system 400 components described above comprises, at 802, the user 115 launching the browser 412 and accessing the intermediate computer 420 to launch an OLB session. At 804, the user 115 navigates the interface 414 that is displayed to access the checking account 422. At 806, the user 415 submits a first request 461 to view an image 443 of a check 100 included in the displayed 414 transaction history, e.g., by clicking on a link or a check icon, and at 808, the request 461 is received at the intermediate computer 420.

At 810, the dynamic sequence program 426 receives data that an image 443 of a check 100 has been requested, e.g., from the OLB program 424, and receives or determines a first or current sequence 427 of queries 462 having respective query configurations that are available to attempt to retrieve the image 443 from the image server 440. According to one embodiment, the first or current sequence 427 is the sequence specified by the FI 435 and/or image server host 445. The first or current sequence 427 may also be received from another source as appropriate.

At 812, the dynamic sequence program 426 accesses the database 428 to access historical data 429 related to the first sequence 427 of query 462 configurations and any prior attempts to retrieve an image 443 with the first sequence 427. At 814, the dynamic sequence program 426 determines whether the first or current sequence 427 should be transformed or modified into a different sequence 427 based at least in part upon whether historical data 429 satisfies pre-determined criteria.

According to one embodiment, the pre-determined criteria is based at least in part upon the actual number of prior image 443 retrieval successes or failures. For example, according to one embodiment, if the first or current sequence 427 has a first query 462 that has been successful fewer times (using data in FIG. 7A) than a another query 462 executed later in the sequence 427, then the first or current sequence 427 can be transformed or modified into a different sequence 427*m* by advancing the more successful query 462 ahead of the first query 462. According to one embodiment, the order of queries 462 of the modified sequence 427*m* is based on the number of successful image 443 retrievals. According to one embodiment, if the first or current sequence 427 has a first query 462 configuration that has been successful fewer times (using data in FIG. 7B) than a query 462 executed later in the sequence 427, then the first or current sequence 427 is transformed or modified into a different sequence 427*m* by advancing the more successful queries 462 ahead of the first query 462. Ratio data (FIG. 7C) can be used in a similar manner according to another embodiment. The determination of 814 can be determined automatically or after a minimum or pre-determined number of queries 462 has been executed.

Referring again to FIG. 8, whether the first/current query sequence 427 is utilized or a sequence modified 427*m* according to embodiment is utilized, the first query 462 of that determined sequence 427 is submitted to the image server 440 to attempt to retrieve the requested image 443 at 816. At 818, the requested image 443 is retrieved from the image server 440, or the next query 462 of the determined sequence 427 is executed. More specifically, if the first query 462 of the determined sequence 427 successfully retrieves the requested image 443, then the requested image 443 is retrieved to the intermediate computer 420, provided by the dynamic sequence program 426 to the OLB 424, and displayed 414 to the user 415. Otherwise, the next or second query 462 of first determined sequence 427 is executed as another attempt to retrieve the requested image 443 from the image server 440.

At 820, the requested image 443 is retrieved from the image server 440 or the next query 462 of the determined sequence 427 is executed. More specifically, if the second query 462 of the determined sequence 427 successfully retrieves the requested image 443, then the requested image 443 is retrieved to the intermediate computer 420, provided by the dynamic sequence program 426 to the OLB 124, and displayed to the user 415. Otherwise, the next or third query 462 of first determined sequence 427 is executed as another attempt to retrieve the requested image 443 from the image server 440.

At 822, the requested image 443 is retrieved from the image server 440 or the next query 462 of the determined sequence 427 is executed. More specifically, if the third query 462 of the determined sequence 427 successfully retrieves the requested image 443, then the requested image 443 is retrieved to the intermediate computer 420, provided by the dynamic sequence program 426 to the OLB 424, and displayed to the user 415. Otherwise, the next query 426 of first determined sequence 427 is executed as another attempt to retrieve the requested image 443 from the image server 440, and so on for each query 462 of the determined sequence 427. If no query 426 of the determined sequence 427 is able to retrieve the requested image 443, then an error message 466 may be generated by the dynamic sequence program 426 or OLB program 424 and displayed to the user 415.

At 824, the historical data 429 is updated with the results of executing queries 462 of the first determined sequence 427 (818-822). The historical data 429 can be updated in real time (e.g., updated after each of 818, 820, 822), or after a final result 464 is determined (e.g., after a determination is made that there was success or failure in retrieving the requested image 443).

The dynamic sequence program 426 determines a second time at 826 whether to transform or modify the first or current sequence 427 (816) into a different sequence 427*m* based at least in part upon the updated historical data 429 and whether the updated historical data 429 satisfies pre-determined criteria as discussed above. If pre-determined criteria are not satisfied, then the same sequence 427 can be utilized for subsequent image requests 461 or OLB sessions whereas if pre-determined criteria is satisfied, then the first query sequence 427 is modified to form a second, different sequence 427*m* according to embodiments that is utilized for subsequent image requests 461 or OLB sessions.

When another request 461 for an image 443 of a check 100 is received at the intermediate computer 420 from the same user 415 or involving the same FI 435, then at 830, the first query 462 of the modified, second sequence 427*m* is submitted to the image server 440 and executed at 830 to attempt to retrieve the requested image 443. At 832, the requested image 443 is retrieved from the image server 440 using the first query 462 of second determined sequence 427*m* and displayed to the user 415 else submit second and additional queries 462 as needed are submitted to the image server 440, and if no other queries of the second determined sequence 427*m* are available, an error message 466 can be generated and displayed to the user 415 that the requested image 433 could not be retrieved.

The updates to the historical data 429 and determinations whether to modify a current query sequence 427 can be performed after each image request 461, after each query 462 is executed, after all of the queries 462 for a particular request 461 are executed, during each OLB session or at other times such that the query sequence 427 is dynamic and changes over time with changes of the historical data 429. Thus, there may be some times when the sequence 427 remains the same and other times when the sequence is modified 427*m*. Further, the sequence 427 may be modified over time such that the modified sequence 427*m* at some future time is the same as the original sequence. Or, the modified sequence 427*m* may never be the same as the original sequence.

FIGS. 9A-I illustrate one example of how embodiments may be utilized to update historical data 429 and how sequences 427 can be dynamically modified based upon the updated historical data. Referring to FIG. 9A, the first or initial sequence 427*a* of three queries 462*a-c* having respective query configurations that have been utilized in the past to attempt to retrieve requested images 443. In the illustrated example, the first historical data 429*a* indicates that Query 1 has been utilized successfully three times and failed once such that the ratio of successes to failures is 3:1, and each of Query 2 and Query 3 has been utilized two times, both of which failed to retrieve the requested image, thereby resulting in "0" successes, "2" failures, and a ratio of successes to failures of 0/2. In this example, FIG. 9A represents a starting point of a sequence 427a and historical data 429a to explain how embodiments may be implemented, e.g., historical data 429a generated using a static sequence 427a specified by a FI 435 and/or host 445. If historical data 429a is not yet available, then the historical data 429a can be collected until sufficient data is obtained.

Referring to FIG. 9B, e.g., during a new OLB session, as an example, the first or initial sequence 427a is utilized, and the first query 462a of the sequence 427a, Query 1, is executed to attempt to retrieve a requested check image 443. In this example, however, Query 1 has failed to retrieve the image 443 such that the first historical data 429a is updated to form second historical data 429b reflecting that the number of failures of Query 1 increased from "1" to "2" and the ratio is changed from "3/1" to "3/2."

Referring to FIG. 9C, the second query 426b of the sequence 427a, Query 2, is executed to attempt to retrieve a requested check image 443. In this example, however, Query 2 has also failed to retrieve the image 443 such that the second historical data 429b is updated to form third historical data 429c that shows that the number of failures as increased from "2" to "3" and the ratio is changed from "0/2" to "0/3."

Referring to FIG. 9D, the third query 426c of the sequence 427a, Query 3, is executed to attempt to retrieve a requested check image 443. In this example, Query 3 was successful in retrieving the image 443 such that the third historical data 429c is updated to form fourth historical data 429d that indicate the number of successes is increased from "0" to "1" and the ratio is changed from "0/2" to "1/2."

Referring to FIG. 9E, the dynamic sequence program 426 is executed to determine whether to modify the initial sequence 427a (1, 2, 3) based upon the updated historical data 429d in FIG. 9D. In the illustrated example, the initial sequence 427a (1, 2, 3) is modified to form a different, second sequence 427b (1, 3, 2) based upon the fourth historical data 429d, e.g., based upon the number of successes and/or the ratio, both of which result in changing the first sequence 427a (1, 2, 3) to the second sequence 427b (1, 3, 2) as shown in FIG. 9E.

Referring to FIG. 9F, the first query 426a of the second sequence 427b, Query 1, is executed to attempt to retrieve a requested check image 443. In this example, Query 1 failed, and the fourth historical data 429d is updated to fifth historical data 429e that includes the number of failures being increased from "2" to "3" and the ratio being changed from "3/2 to "3/3" or 1.

Referring to FIG. 9G, the second query 426b of the second sequence 427b, Query 3, is executed to attempt to retrieve a requested check image 443. In this example, Query 3 successfully retrieved the image 443, and the fifth historical data 429e is updated to sixth historical data 429f that includes the number of successes being increased from "1" to "2" and the ratio being changed from "1/2 to "2/2" or 1. Thus, as shown in FIG. 9G, both Query 1 and Query 3 of the second sequence 427n have the same ratio, but Query 1 has more successful image retrievals.

Referring to FIG. 9H, the dynamic sequence program 426 is executed to determine whether to modify the second sequence 427b (1, 3, 2) based upon the updated historical data 429f in FIG. 9G. In one embodiment in which the number of successful image retrievals is compared, the sequence 427b would remain the same since Query 1 has 3 successful retrievals whereas Query 3 has only two successful retrievals. However, in another embodiment, as illustrated, ratios are compared, and the ratios are the same for Query 1 (1/1) and Query 3 (1/1). In the event of a tie, according to one embodiment, the tie can be broken by considering other pre-determined criteria or combinations, e.g., ratio and successes, ratio and failures. In another embodiment, the tie is broken based upon the query that was successfully utilized most recently, and in this example, Query 3 was utilized most recently to retrieve a requested image 443. Accordingly, in the embodiment illustrated in FIG. 9H, the second sequence 427b (1, 3, 2) is modified to form a different, third sequence 427c (3, 1, 2) based upon the query that was utilized most recently since the ratios for both Query 1 and Query 3 are the same.

Further, as shown in FIG. 9I, a modification to sequence 427b may involve deleting a query from the sequence. In the illustrated embodiment, Query 2 is deleted due to one or more of having insufficient number of successes, too many failures, or a success to failure ratio that was below a pre-determined ratio.

Thus, it should be understood that query sequences 427 can be modified by changing the order and/or deleting queries 426. Further, one or multiple criteria can be the basis of determining whether the sequence 427 is modified. For example, the determination may involve only the number of successes, only the number of failures, only the ratio, only the query that was utilized successfully most recently, and a combination of two, three or all of these criteria. Accordingly, FIGS. 9A-I are provided to illustrate one of various examples of how embodiments may be implemented.

Figure 10:
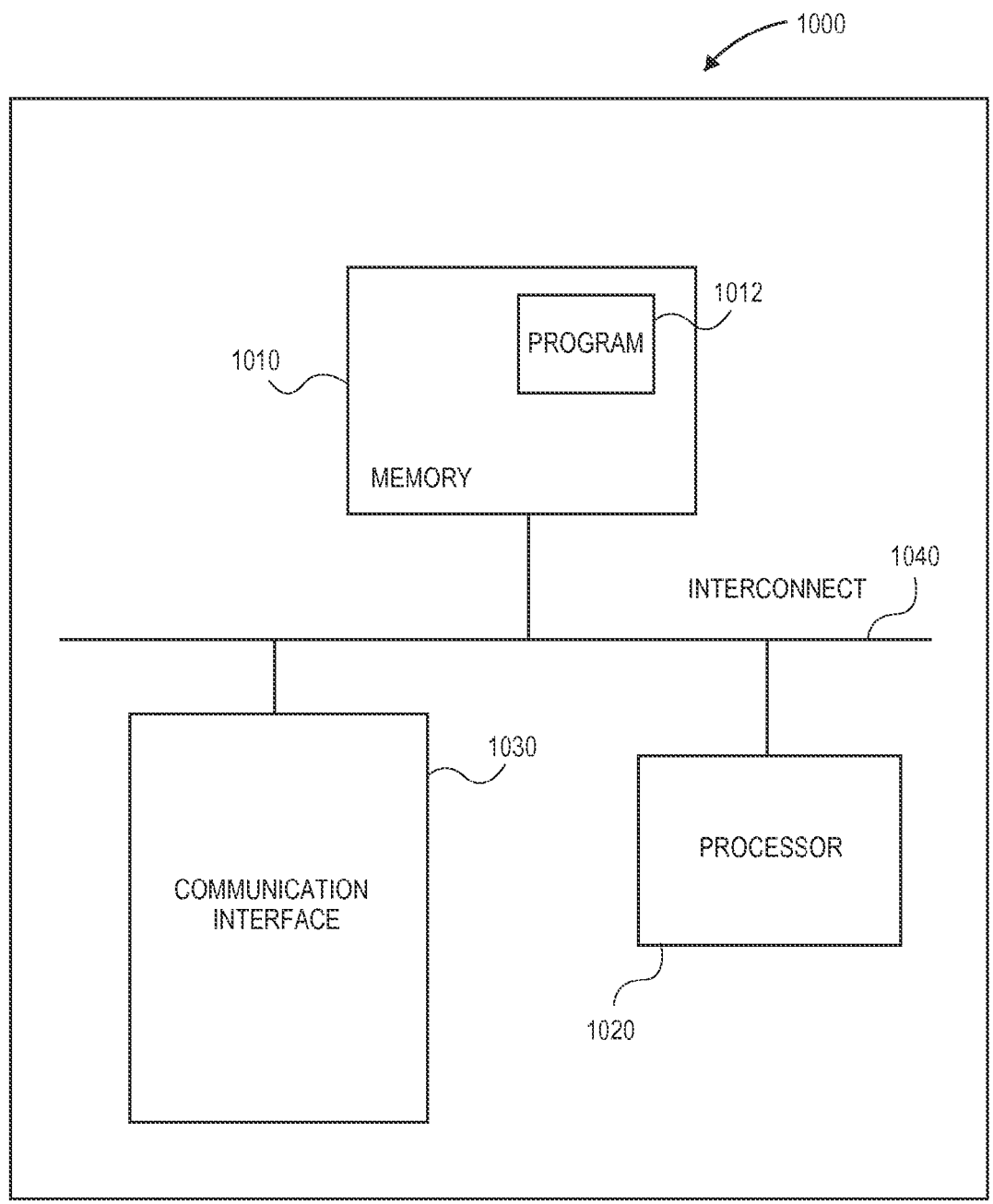
FIG. 10 is a block diagram of a computing apparatus or system in which various embodiments may be implemented or that may be utilized to execute various embodiments.

FIG. 10 generally illustrates certain components of a computing device 1000 that may be utilized to execute embodiments and that includes a memory 1010, program instructions 1012, a processor or controller 1020 to execute instructions 1012, a network or communications interface 1030, e.g., for communications with a network or interconnect 1040 between such components. The memory 1010 may be or include one or more of cache, RAM, ROM, SRAM, DRAM, RDRAM, EEPROM and other types of volatile or non-volatile memory capable of storing data. The processor unit 1020 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1040 may include a system bus, LDT, PCI, ISA, or other types of buses, and the communications or network interface may, for example, be an Ethernet interface, a Frame Relay interface, or other interface. The network interface 1030 may be configured to enable a system component to communicate with other system components across a network which may be a wireless or various other networks. It should be noted that one or more components of computing device 1000 may be located remotely and accessed via a network. Accordingly, the system configuration provided in FIG. 10 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1020 performs steps or executes program instructions 1012 within memory 1010 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, which certain embodiments are described with reference to an on-line banking program available form Intuit Financial Services of Intuit Inc., it should be understood that embodiments may be utilized with various consumer on-line banking, business/corporate on-line banking, personal financial management (PFM), small business financial management (SBFM), marketing customer information file (MCIF), host systems, and other similar solutions involving retrieval of financial documents, one example of which is a negotiable instrument such as a check. Further, it should be understood that production servers can include one or multiple servers that host sites or pages for various banks.

Moreover, it should be understood that embodiments may involve various numbers of users, intermediate host computers and FI or core computers or servers. Further, the dynamic sequence program can be executed to determine whether query sequences should be modified in response to pre-determined actions including, but not limited to, launching of a new on-line banking session, termination of an on-line banking session, each time historical data is updated, after a predetermined number of historical data, periodically (e.g., daily or weekly), and query sequences can also be modified at these various times such that the sequence is updated before, during or after an on-line banking session.

Further, while examples are provided with three and other numbers of queries having respective query formats, embodiments may involve other numbers of queries, users, FIs, hosts and associated computers and servers.

It should also be understood that while embodiments have been described with respect to software programs executing on particular computers of an on-line banking system and computer program products, embodiments may also be utilized with mobile communication devices and other devices that support Internet connectivity on the front-end of such systems, which may or may not utilize a browser. For example, embodiments may involve a user or account holder and a cellular telephone, iTV or other device that can connect to the Internet. Thus, a "user computer" is defined herein as including a desktop or laptop computer as well as other computing devices capable of Internet communications such as a mobile communication device and other devices discussed herein.

Further, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention.

Additionally, certain of the steps may be performed concurrently in a parallel process as well as performed sequentially. For example, historical data updates can occur at various times and concurrently with other actions, determinations whether to modify a sequence can occur at various times and concurrently with other actions. Thus, the methods shown in various flow diagrams are not intended to be limited to a particular sequential order, particularly in instances in which certain steps may or may not be performed. Accordingly, embodiments are intended to exemplify alternatives, modifications, and equivalents that may fall within the scope of the claims.

What is claimed is:

1. A computer-implemented method for determining a sequence of queries to be utilized for retrieving an image of a negotiable instrument, the method being performed by an intermediate computer in communication through respective networks with respective computers of a financial institution and of a user that has an account with the financial institution, the method comprising:
   the intermediate computer hosting an online banking program and receiving a first request for a first image of a first negotiable instrument that was utilized in a first completed transaction;
   the intermediate computer determining a first sequence of queries comprising respective query configurations available to attempt to retrieve the first image from a data store comprising respective images of respective negotiable instruments for respective completed transactions, the first sequence being determined based at least in part upon first historical data of whether respective query configurations were successfully used in the past to retrieve respective requested images from the data store;
   the intermediate computer submitting a first query of the first sequence to the data store;
   the intermediate computer receiving a first result generated by executing the first query; and
   the intermediate computer determining a second sequence of queries comprising respective query configurations based at least in part upon second historical data reflecting the first result, wherein at least one query of the second sequence of queries is executed to retrieve at least one image from the data store.

2. The method of claim 1, the second historical data comprising the first historical data updated with the first result.

3. The method of claim 1, wherein the second sequence is different from the first sequence such that the first sequence is dynamically modified by the intermediate computer.

4. The method of claim 3, wherein the first sequence is changed by the intermediate computer re-ordering or deleting at least one of the queries of the first sequence.

5. The method of claim 1, wherein the second historical data reflects that the first query of the first sequence successfully retrieved the first image.

6. The method of claim 1, wherein the first query of the first sequence was not successful in retrieving the first image, the method further comprising the intermediate computer:
   submitting a second query of the first sequence to the data store; and
   receiving a second result generated by executing the second query of the first sequence, wherein the second historical data indicates that the first query of the first sequence was not successful in retrieving the first image and reflects the second result of executing the second query of the first sequence.

7. The method of claim 1, further comprising the intermediate computer:
   receiving a second request for the first image;
   submitting a first query of the second sequence to the data store; and receiving a second result generated by executing the first query of the second sequence.

8. The method of claim 1, further comprising the intermediate computer:
receiving a first request for a second image of a second negotiable instrument that was utilized in a second completed transaction;
submitting a first query of the second sequence to the data store; and
receiving a second result generated by executing the first query of the second sequence.

9. The method of claim 1, the first historical data and second historical data comprising at least one of a number of successful query configurations, a number of unsuccessful query configurations, and a ratio of successful and unsuccessful query configurations.

10. The method of claim 1, the first historical data and second historical data being stored in respective first and second tables.

11. The method of claim 1, wherein the first sequence is modified by the intermediate computer after a minimum number of queries have been submitted to the data store.

12. The method of claim 1, two queries of the second sequence being determined by the intermediate computer to be the first query of the second sequence based at least in part upon the second historical data, and the query of the two queries that utilized most recently to successfully retrieve a requested image being determined by the intermediate computer to be the first query of the second sequence and the other query of the two queries being determined to be the second query of the second sequence.

13. The method of claim 1, further comprising the intermediate computer submitting at least one other query of the first sequence of queries to the data store, wherein the second historical data and the second sequence are dynamically modified as additional respective results are received.

14. The method of claim 1, the first image of the first negotiable instrument comprising an image of a check.

15. The method of claim 14, the image of the check comprising an image of a written check.

16. The method of claim 1, the intermediate computer receiving the first request while the account holder uses the first computer to access the intermediate computer during an on-line banking session to view transaction history within the user's account with the financial institution.

17. The method of claim 16, the intermediate computer determining the second sequence during the on-line banking session.

18. The method of claim 1, the respective query configurations comprising:
an address or location of the data store;
a protocol for communicating with the data store; and
at least one data element used to identify the requested image.

19. The method of claim 1, the respective query configurations comprising data of a negotiable instrument selected from the group consisting of an account number, a number of the negotiable instrument, a date of the negotiable instrument, a routing number of the negotiable instrument, an identification of the account holder, and an identification of the negotiable instrument image.

20. The method of claim 1, the respective query configurations comprising respective different combinations of two or more data elements.

21. The method of claim 1, the intermediate computer hosting a database storing the first historical data and the second historical data.

22. The method of claim 1, wherein with execution of additional queries and respective generated results, respective historical data and respective query sequences are dynamically updated by the intermediate computer to adapt to at least one change selected from the group consisting of a change of a Magnetic Ink Character Recognition (MICR) line of negotiable instruments, a change of negotiable instruments due to an acquisition or merger involving the financial institution, a change of a core server associated with the financial institution, a change in printing of negotiable instruments, and a change in a manner in which negotiable instruments are stored by the data store.

23. The method of claim 1, the intermediate computer transmitting the first query of the first sequence to an image server comprising the data store through a network.

24. The method of claim 1, wherein with additional queries and respective generated results, respective historical data and respective sequences are dynamically updated by the intermediate computer to adapt to a customer of the financial institution using negotiable instruments having different configurations.

25. The method of claim 1, the intermediate computer determining the second sequence in response to a pre-determined action.

26. The method of claim 25, the pre-determined action comprising launching or termination of an on-line banking session.

27. The method of claim 25, the pre-determined action comprising each historical data update.

28. The method of claim 25, the intermediate computer determining the second sequence periodically.

29. A computer-implemented method for determining a sequence of queries to be utilized for retrieving an image of a negotiable instrument, the method being performed by an intermediate computer in communication through respective networks with respective computers of a financial institution and of a user that has an account with the financial institution, the method comprising:
the intermediate computer hosting an online banking program and receiving a request for an image of a negotiable instrument that was utilized in a completed transaction;
the intermediate computer determining a first sequence of queries comprising respective query configurations available to attempt to retrieve the image from a data store comprising a plurality of images of respective negotiable instruments for respective completed transactions, the first sequence being determined based at least in part upon first historical data of whether respective query configurations were successfully used in the past to retrieve respective requested images from the data store;
the intermediate computer submitting a first query of the first sequence to the data store;
the intermediate computer receiving a first result generated by executing the first query; and
the intermediate computer determining a second sequence of queries comprising respective query configurations based at least in part upon second historical data reflecting the first result, wherein at least one query of the second sequence of queries is executed to retrieve the previously requested image or another image from the data store.

30. A computer-implemented method for determining a sequence of queries to be utilized for retrieving an image of a financial document associated with an account a user has with a financial institution, the method being performed by an intermediate computer in communication through respective networks with respective computers of the financial institution and of the user that has the account with the financial institution, the method comprising:

the intermediate computer hosting an online banking program and receiving a first request for an image of a financial document associated with the user's account and reflecting a completed transaction;

the intermediate computer determining a first sequence of queries comprising respective query configurations available to attempt to retrieve the first image from a data store comprising respective images of respective financial documents of respective completed transactions, the first sequence being determined based at least in part upon first historical data of whether respective query configurations were successfully used in the past to retrieve respective requested images from the data store;

the intermediate computer submitting a first query of the first sequence to the data store;

the intermediate computer receiving a first result generated by executing the first query; and the intermediate computer determining a second sequence of queries comprising respective query configurations based at least in part upon second historical data reflecting the first result, wherein at least one query of the second sequence of queries is executed to retrieve at least one image of a financial document from the data store.

31. The method of claim 30, the requested image of the financial document comprising an image of a negotiable instrument.

32. The method of claim 31, the requested image of the negotiable instrument comprising an image of a check.

33. The method of claim 30, the requested image of the financial document comprising an image of an account statement reflecting a completed transaction.

34. The method of claim 30, the requested image of the financial document comprising an image of a transaction receipt reflecting a completed transaction.

35. A computer-implemented method for determining a sequence of queries to be utilized for retrieving an image of a negotiable instrument, the method being performed by an intermediate computer in communication through respective networks with respective computers of a financial institution and of a user that has an account with the financial institution, the method comprising:

the intermediate computer hosting an online banking program and receiving a first request for a first image of a first negotiable instrument that was utilized in a first completed transaction;

the intermediate computer determining a first sequence of queries comprising respective query configurations available to attempt to retrieve the first image from a data store comprising respective images of respective negotiable instruments for respective completed transactions, the first sequence being determined based at least in part upon first historical data of whether respective query configurations were successfully used in the past to retrieve respective requested images from the data store;

the intermediate computer submitting a first query of the first sequence to the data store; and the intermediate computer receiving a first result generated by executing the first query;

the intermediate computer transforming the first sequence into a second sequence of queries different from the first sequence, the second sequence comprising respective query configurations based at least in part upon second historical data reflecting the first result, wherein the second sequence is utilized for at least one subsequent image request, wherein at least one query of the second sequence of queries is executed to retrieve at least one image from the data store.

36. The method of claim 35, wherein the first query of the first sequence was not successful in retrieving the first image, the method further comprising the intermediate computer:

submitting a second query of the first sequence to the data store; and receiving a second result generated by executing the second query of the first sequence, wherein the second historical data indicates that the first query of the first sequence was not successful in retrieving the first image and reflects the second result of executing the second query of the first sequence.

37. The method of claim 35, further comprising the intermediate computer:

receiving a second request for the first image;

submitting a first query of the second sequence to the data store; and receiving a second result generated by executing the first query of the second sequence.

38. The method of claim 35, further comprising the intermediate computer:

receiving a first request for a second image of a second negotiable instrument that was utilized in a second completed transaction;

submitting a first query of the second sequence to the data store; and receiving a second result generated by executing the first query of the second sequence.

* * * * *